US006059085A

United States Patent [19]

Farnsworth

[11] Patent Number: 6,059,085

[45] Date of Patent: May 9, 2000

[54] SHAFT DECOUPLER

[75] Inventor: Gary A. Farnsworth, Mesa, Ariz.

[73] Assignee: AlliedSignal Inc., Morristown, N.J.

[21] Appl. No.: 09/213,498

[22] Filed: Dec. 17, 1998

[51] Int. Cl.[7] .................................................... F16D 23/00

[52] U.S. Cl. .................... 192/55.1; 192/56.5; 192/56.56; 464/32

[58] Field of Search ............................... 192/55.1, 69.81, 192/46, 56.1, 56.5, 56.56; 464/32

[56] References Cited

U.S. PATENT DOCUMENTS

| | | | |
|---|---|---|---|
| 1,956,183 | 4/1934 | Lyon . | |
| 2,564,605 | 8/1951 | Martin | 464/43 |
| 2,642,730 | 6/1953 | Snyder | 464/32 |
| 2,730,666 | 1/1956 | Cohen et al. . | |
| 2,764,882 | 10/1956 | Bosworth . | |
| 2,942,480 | 6/1960 | Schindel . | |
| 3,136,400 | 6/1964 | Carr . | |
| 4,196,799 | 4/1980 | Taylor et al. . | |
| 4,768,634 | 9/1988 | Quick et al. | 415/123 |
| 4,871,296 | 10/1989 | Laessle et al. | 192/69.81 |
| 5,267,433 | 12/1993 | Burch | 192/48.3 X |

*Primary Examiner*—Charles A Marmor
*Assistant Examiner*—Saúl J. Rodriguez
*Attorney, Agent, or Firm*—William J. Zak, Jr., Esq.

[57] ABSTRACT

A decoupling apparatus for disconnecting an engine starter from an engine includes a first rotatable decoupler shaft, having a first clutch jaw, coaxially mounted with respect to a second rotatable decoupler shaft having a second clutch jaw. The two shafts can translate relative to each other from a first position in which the first and second clutch jaws are engaged to a second position in which the jaws are disengaged. A torsional shear pin with a unitary shaft has a first end in contact with a resilient member and a second end attached to the first decoupler shaft, thereby urging the first and second decoupler shafts into the first position. The torsional shear pin is frangible in response to angular movement of the first decoupler shaft relative to the second decoupler shaft to release the axially compressive force, thereby permitting the first and second decoupler shafts to move into the second position.

14 Claims, 2 Drawing Sheets

SHAFT DECOUPLER

FIELD OF THE INVENTION

The present invention relates generally to turbomachinery and associated devices. More particularly, the invention relates to a backdrive overload decoupling mechanism having an automatic low reverse torque disconnect.

BACKGROUND OF THE INVENTION

Various machines or power drive mechanisms require the use of a clutch between a drive member and a driven member to establish selective engagement therebetween when power or torque is applied to the drive member. In such applications, it is highly desirable that the clutch be automatically and instantaneously responsive to the application of power to the drive member to effect engagement with the driven member and to maintain such engagement until the power is removed, at which time the clutch will automatically disengage the members. This is prevalent in engaging and disengaging drive axles of vehicles, for instance. Often there may be locking means which may be automatically or manually disengaged to immobilize the clutch.

Similar types of clutches may be used in aircraft applications where a turbine driven starter drives an engine through an overrunning clutch assembly. A gearbox conventionally is coupled between the starter and the engine. Ideally, hot gases power the turbine that turns the engine to be started. Once the engine speed exceeds self-sustaining speed, power to the starter is shut off and the overrunning clutch disconnects the engine from the turbine to prevent high speed backdriving. The overrunning clutch also is effective to allow the engine and gearbox to continue to operate should the starter turbine jam. Relatively large torque is required to drive the engine. However, problems would occur and not be compensated for should malfunctions occur in the starter itself, such as bearing and overrunning clutch failures or the like.

Accordingly, a need exists for a shaft decoupling mechanism that is effective at a small back torque to disconnect the starter from the engine.

SUMMARY OF THE INVENTION

In accordance with the present invention, a decoupling apparatus is disclosed that offers a fail-safe means for disconnecting a starter from an engine.

In a preferred embodiment of the invention, the decoupling apparatus comprises a first rotatable decoupler shaft driven by the starter turbine having a first clutch jaw. A second rotatable decoupler shaft configured to mate with the engine gearbox shafting and having a second clutch jaw is mounted coaxially with respect to the first decoupler shaft. The first and second decoupler shafts are axially displaceable relative to one another between a first position and a second position. In the first position, the first and second clutch jaws mesh together to transmit torque between the first and second decoupler shafts. In the second position, the first and second clutch jaws are disengaged one from another.

The apparatus includes a torsional shear pin comprising a unitary shaft having first and second ends. The first end operatively engages a resilient member and the second end is operatively attached to the first decoupler shaft. The resilient member and torsional shear pin cooperate to exert an axially compressive force between the first and second decoupler shafts, thereby urging the first and second decoupler shafts axially into the first position in which the clutch jaws are engaged. The configuration of the clutch jaws precludes relative angular movement as long as torque is being transmitted from the first decoupler shaft to the second decoupler shaft, but permit relative angular movement if the second decoupler shaft begins to back drive the first decoupler shaft. The torsional shear pin is frangible in response to angular movement of the first decoupler shaft relative to the second decoupler shaft. Once sheared, the shear pin releases the axially compressive force, thereby permitting the first and second decoupler shafts to move into the second position and allowing the first and second clutch jaws to disengage.

BRIEF DESCRIPTION OF THE DRAWING

The invention will be better understood from a reading of the following detailed description taken in conjunction with the drawing figures in which like reference designators are used to designate like elements, and in which.

DETAILED DESCRIPTION

Figure 1:
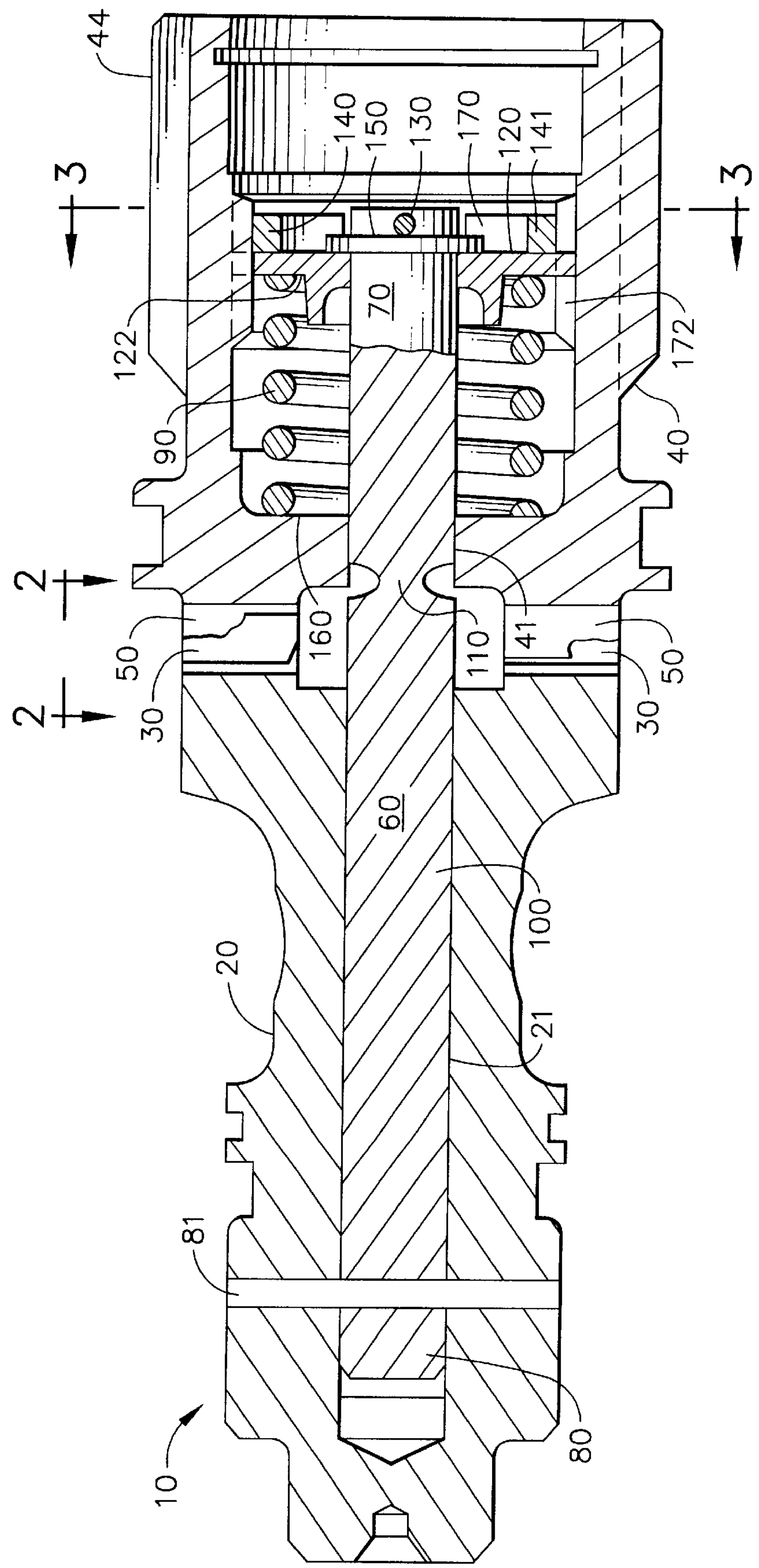
FIG. 1 is a cross-sectional view of a decoupling apparatus according to the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows in cross-section a decoupling apparatus 10 incorporating features of the present invention. Apparatus 10 comprises a first rotatable decoupler shaft 20 configured to mate with an air turbine starter through a starter clutch race (not shown). Shaft 20 comprises a first axial bore 21 and a first clutch jaw 30. Apparatus 10 further comprises a second rotatable decoupler shaft 40 configured to mate with an engine gearbox (not shown). Shaft 40 comprises a second axial bore 41 and a second clutch jaw 50. Second decoupler shaft 40 is mounted coaxially with respect to first decoupler shaft 20 such that when clutch jaw 30 engages clutch jaw 50, shafts 20 and 40 rotate in unison.

First decoupler shaft 20 and second decoupler shaft 40 are axially displaceable relative to one another from a coupled position in which first clutch jaw 30 and second clutch jaw 50 cooperate to transmit torque between first decoupler shaft 20 and second decoupler shaft 40 to a decoupled position in which first clutch jaw 30 and second clutch jaw 50 are disengaged one from another. The relative axial displacement capability may be accomplished for example by providing splines 44 for coupling second decoupler shaft 40 to the engine gearbox.

Apparatus 10 further comprises a torsional shear pin 60 comprising a unitary shaft having a first end 70 disposed in second axial bore 41 and a second end 80 disposed in first axial bore 21. Torsional shear pin 60 further comprises a main section 100 and a frangible section 110. Frangible section 110 is configured to have a torsional strength less than that of main section 100. In the preferred embodiment, frangible section 110 is undercut to a diameter less than that of main section 100. Alternatively, frangible section 110 and main section 100 may be of comparable diameters with frangible section 110 composed of a material different and of a lesser torsional strength than that of main section 100.

Figure 3:
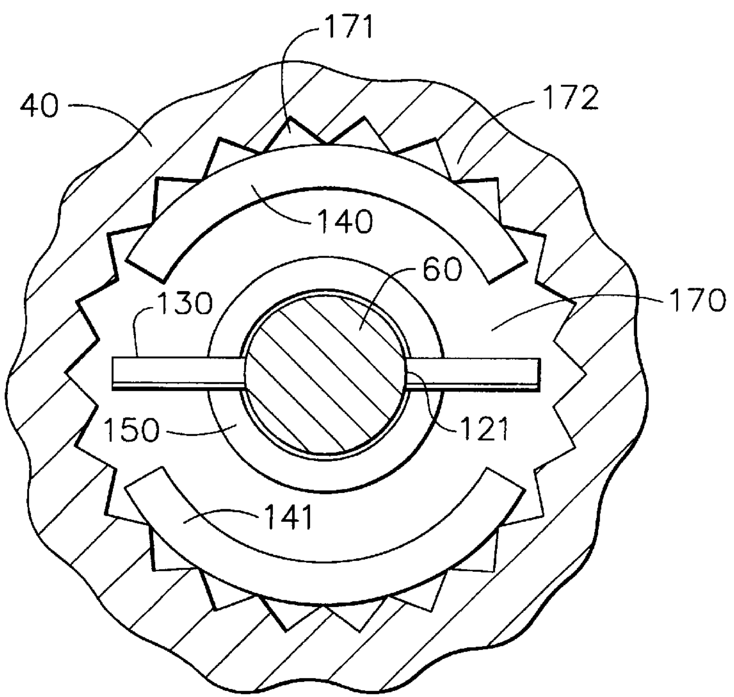
FIG. 3 is a fragmentary cross-sectional view taken along line 3—3 of FIG. 1.

Second end 80 is operatively attached to first decoupler shaft 20 such as by means of a transverse solid pin 81 or alternatively a roll pin. First end 70 is circumscribed by a splined washer 170 having splines 171 which engage corresponding splines 172 in second decoupler shaft 40. As is more clearly illustrated in FIG. 3, splined washer 170 further comprises a pair of limit stops 140, 141 which protrude from upper surface 120 of splined washer 170. A transverse pin 130 is disposed within a hole 121 through torsional shear pin 60. Pin 130 cooperates with limit stops 140, 141 to permit a predetermined angular displacement of torsional shear pin 60 relative to splined washer 170 and, therefore, relative to second decoupler shaft 40. A low-friction washer 150 is disposed axially between splined washer 170 and pin 130 to provide a low friction surface that enhances the rotational freedom of pin 130.

Second decoupler shaft 40 houses a spring 90. Spring 90 abuts an inner wall 160 of second decoupler shaft 40 and lower face 122 of splined washer 170. Splined washer 170 transmits the load imparted by spring 90 to pin 130 which, in turn, imparts a tensile load to shear pin 60. This tensile load is imparted to transverse pin 81, then to first decoupler shaft 20 at second end 80 resulting in an axially compressive force between first decoupler shaft 20 and second decoupler shaft 40 at their respective clutch jaws 30, 50. Accordingly, first decoupler shaft 20 and second decoupler shaft 40 are urged axially into the coupled position.

Figure 2:
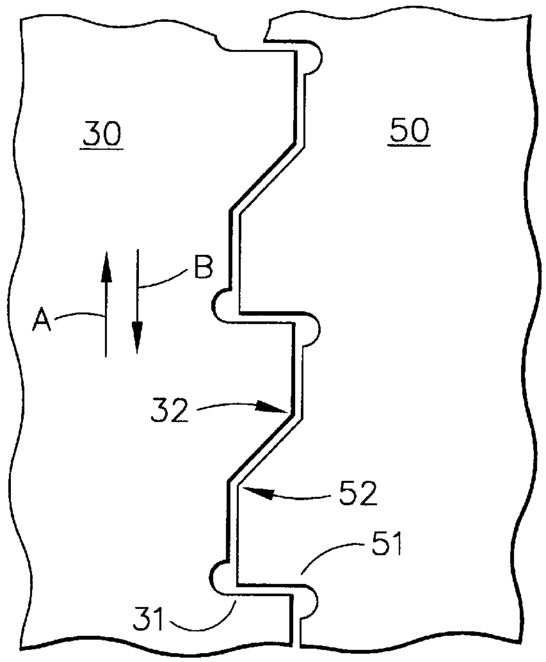
FIG. 2 is a fragmentary elevational view taken along line 2—2 of FIG. 1.

As is more clearly illustrated in FIG. 2, first clutch jaw 30 and second clutch jaw 50 each comprise an annular array of teeth 31, 51 having complementary sawtooth profiles. Teeth 31, 51 cooperate to transmit torque when first decoupler shaft 20 is rotated in a first direction "A" relative to second decoupler shaft 40. Teeth 31, 51 cooperate to generate an axial ramping force when first decoupler shaft 20 is rotated in a second direction "B" relative to second decoupler shaft 40.

Teeth 31, 51 have a an angular displacement between point 32, and point 52, substantially (i.e. within plus or minus 10 degrees) equal to the predetermined angular displacement permitted by limit stops 140, 141. This coincidence allows a two phase decoupling of apparatus 10. In the first phase, as second decoupler shaft 50 back drives first decoupler shaft 30 (in direction "B" of FIG. 2) teeth 31, 51 generate an axial displacement of first decoupler shaft 20 relative to second decoupler shaft 40. During this phase spring 90 is compressed without shearing shear pin 60. In the second phase, limit stops 140 and 141 acting on transverse pin 130 arrest further angular movement of shear pin 60 relative to second decoupler shaft 40. The relative angular movement between first decoupler shaft 20 and second decoupler shaft 40 then shears shear pin 60. Once shear pin 60 is sheared, spring 90 is effectively decoupled from first decoupler shaft 20, thereby releasing the axially compressive force between first decoupler shaft 20 and second decoupler shaft 40. Upon release of this compressive force, first decoupler shaft 20 and second decoupler shaft 40 move into the decoupled position allowing first clutch jaw 30 and second clutch jaw 50 to disengage.

Various modifications and alterations of the above described apparatus will be apparent to those skilled in the art. For example, spring 90, splined washer 170 and transverse pin 130 may be housed within the first decoupler shaft which provides the drive torque, rather than within the driven second decoupler shaft. Moreover, other torque transmitting engagement devices known in the art may be substituted for teeth arrays 31, 51. Accordingly, the foregoing detailed description of the preferred embodiment of the invention should be considered exemplary in nature and not as limiting to the scope and spirit of the invention as set forth in the following claims.

What is claimed is:

1. A decoupling mechanism comprising:

a first decoupler shaft having a first bore longitudinally disposed therethrough and comprising a first clutch jaw;

a second decoupler shaft having a second bore longitudinally disposed therethrough and comprising a second clutch jaw, said first clutch jaw engageable with said second clutch jaw to transmit torque in a first angular direction; and a unitary shear pin comprising a first portion and a second portion, said first portion being disposed substantially within said first bore, said second portion being disposed substantially within said second bore, said unitary shear pin being shearable in response to a predetermined angular displacement between said first decoupler shaft and said second decoupler shaft into said first and second portions.

2. An apparatus in accordance with claim 1, wherein:

said first portion is rigidly attached to said first decoupler shaft and said second portion is slidably disposed within said second bore; said second decoupler shaft further comprising a limit stop, said limit stop operatively engaging said second portion to limit angular displacement of said second portion relative to said second decoupler shaft to a predetermined angular displacement.

3. An apparatus in accordance with claim 2, wherein:

said first portion is of a first thickness, said second portion is of a second thickness, said shear pin further comprising a shear portion, said shear portion having a third thickness less than said first and second thicknesses.

4. An apparatus in accordance with claim 1, wherein:

said shear pin further comprises a hole transversely disposed through said shear pin.

5. An apparatus in accordance with claim 4, comprising:

a transverse pin disposed within said hole.

6. A decoupling mechanism comprising:

a first decoupler shaft having a first bore longitudinally disposed therethrough and comprising a first clutch jaw;

a second decoupler shaft having a second bore longitudinally disposed therethrough and comprising a second clutch jaw, said first clutch jaw engageable with said second clutch jaw to transmit torque in a first angular direction;

a unitary shear pin comprising a first portion and a second portion, said first portion being disposed substantially within said first bore, said second portion being disposed substantially within said second bore, said unitary shear pin being shearable in response to a predetermined angular displacement between said first decoupler shaft and said second decoupler shaft into said first and second portions; and a splined washer disposed within said second decoupler shaft, said splined washer comprising a plurality of splines engaging complimentary splines in said second decoupler.

7. An apparatus in accordance with claim 6, comprising:

a preload spring disposed about said shear pin within said second decoupler shaft, said spring operatively coupled with said second decoupler shaft and said splined washer.

8. A decoupling apparatus for a drive shaft comprising:

a first rotatable decoupler shaft having a first clutch jaw;

a second rotatable decoupler shaft mounted coaxially with respect to said first decoupler shaft, said second decoupler shaft having a second clutch jaw, said first and second decoupler shafts being axially displaceable relative to one another from a first position in which said first and second clutch jaws cooperate to transmit torque between said first and second decoupler shafts to a second position in which said first and second clutch jaws are disengaged one from another;

a resilient member; and a torsional shear pin, said torsional shear pin comprising a unitary shaft having first and second ends, the first end operatively engaging said resilient member and the second end operatively attached to said first decoupler shaft, said resilient member and said torsional shear pin cooperating to exert an axially compressive force between said first and second decoupler shafts thereby urging said first and second decoupler shafts axially into the first position, said torsional shear pin being frangible in response to angular movement of said first decoupler shaft relative to said second decoupler shaft to release the axially compressive force, thereby permitting said first and second decoupler shafts to move into the second position and allowing said first and second clutch jaws to disengage.

9. An apparatus in accordance with claim 8, further comprising:

a transverse pin and limit stop operatively attached to said torsional shear pin, said transverse pin and limit stop cooperating to permit a predetermined angular displacement of said first end of said torsional shear pin relative to said second decoupler shaft.

10. An apparatus in accordance with claim 8, wherein:

said torsional shear pin comprises a main section and a frangible section, said main section having a first torsional strength, said frangible section having a second torsional strength less than said first torsional strength.

11. An apparatus in accordance with claim 10, wherein:

said main section is of a first diameter; and said frangible section comprises a section having a second diameter less than said first diameter.

12. An apparatus in accordance with claim 8, wherein:

said first and second clutch jaws each comprise an annular array of teeth having complementary sawtooth profiles, said teeth cooperating to transmit torque when said first decoupler shaft is rotated in a first angular direction relative to said second decoupler shaft and cooperating to generate an axial force when said first decoupler shaft is rotated in a second angular direction relative to said second decoupler shaft.

13. An apparatus in accordance with claim 12, wherein:

said teeth have an angular displacement substantially equal to the predetermined angular displacement permitted by a transverse pin and limit stop, thereby allowing a two phase decoupling in which in the first phase the teeth generate axial and angular displacement of the first decoupler shaft relative to the second decoupler shaft while compressing the resilient member followed by a second phase in which the pin and limit stop arrest further angular movement of the shear pin relative to the second decoupler shaft and the relative angular movement between the first and second decoupler shaft shears the shear pin thereby decoupling the resilient member from the first decoupler shaft.

14. An apparatus in accordance with claim 8, wherein:

said first decoupler shaft comprises a first axial bore, said second decoupler shaft comprises a second axial bore, said shear pin first end is disposed in said second axial bore, and said shear pin second end is disposed in said first axial bore.

* * * * *